United States Patent Office 2,721,479
Patented Oct. 25, 1955

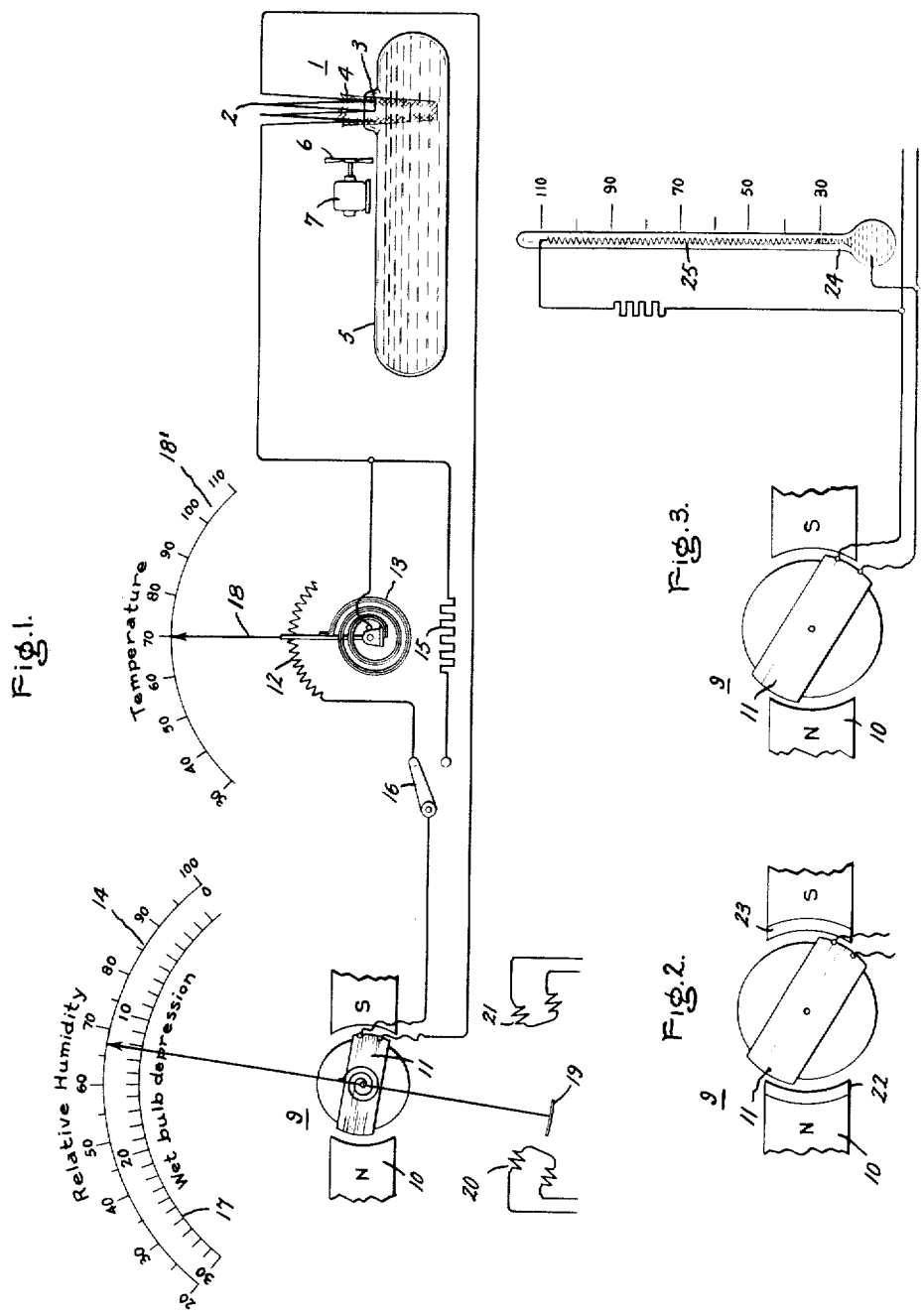

2,721,479

THERMOELECTRIC HUMIDITY MEASURING INSTRUMENT

Harold T. Faus, Lynn, Mass., assignor to General Electric Company, a corporation of New York Application May 15, 1952, Serial No. 287,981

1 Claim. (Cl. 73—338)

My invention relates to humidity measuring and control apparatus, and its object is to provide thermoelectric humidity measuring apparatus having the accuracy, quick response, reliability, calibration stability and convenience generally characteristic of electrical measuring and control instruments.

In carrying my invention into effect, I employ high output thermocouple means for obtaining a measurable current corresponding to the difference between wet and dry bulb temperatures at the existing ambient temperature which is also measured. The current may be measured in terms of such temperature difference, and the relative humidity obtained by referring to known psychrometric tables. However, in most cases, and in the preferred embodiment of my invention, the thermocouple output current may be compensated in response to ambient temperature changes and the current measured directly in terms of relative humidity.

The features of my invention which are believed to be novel and patentable will be pointed out in the claim appended hereto. For a better understanding of my invention reference is made in the following description to the accompanying drawing showing in Fig. 1 the essential elements of a practicable installation of my invention, and in Figs. 2 and 3 alternate forms of temperature compensation.

In the drawing I provide thermocouple means indicated generally at 1 having one junction 2 exposed to the existing atmospheric conditions as regards temperature and moisture content. The other junction 3 is also exposed to the atmosphere but is in intimate contact with a wick 4 constantly supplied by water from a reservoir 5. Preferably a small fan 6 constantly driven by a motor 7 blows air over exposed upper parts of the wick adjacent the junction 3. Hence junction 3 is cooled by the evaporation of water to an extent to which the atmosphere is capable of absorbing additional moisture. The temperature difference at 2 and 4 therefore corresponds to the temperature difference measured by thermometers in the conventional wet and dry bulb thermometer hygrometer arrangement and is related to the moisture content of the air at the prevailing temperature. The junction 2 is therefore termed the dry junction, and junction 3 the wet junction of the thermocouple means.

In order to obtain a thermocouple output ample for my purposes without employing an excessive number of thermocouples, I use a few high output thermocouples. Thermocouples suitable for my purposes may have the positive element made of constantan, and the negative element made of a tellurium-bismuth alloy, the bismuth content being very small and not more but preferably less than 0.1 per cent. A single thermocouple of this type gives 370 microvolts output per degree Fahrenheit temperature difference between the dry and wet junction. Copper in place of constantan may also be used with the tellurium-bismuth alloy. Three such thermocouples connected in series as indicated in the drawing give sufficient output for my purposes.

Such thermocouple means supplies a sensitive measuring instrument 9. The latter instrument has a permanent magnet field 10 and a moving coil pointer operating armature 11, the latter being supplied from the thermocouple source 1. The instrument has the usual return spiral springs, but the zero current position of the pointer is at the right. In series with the thermocouple instrument circuit I provide a resistance which for normal humidity conditions is a variable resistance 12, which is adjusted by a temperature sensitive bimetallic spiral 13 in response to ambient temperature changes and when so used, relative humidity may be read directly from instrument 9 on the upper scale 14. A fixed resistance 15 is used in place of the variable resistance 12 for unusual conditions beyond the practicable range of operation of the automatic temperature compensation direct reading arrangement. A switch 16 is provided for selecting the variable or fixed resistances. When the fixed resistance 15 is used, the instrument measures the temperature difference between the wet and dry junctions of the thermocouple means at 1, and this temperature difference is read on the lower scale 17 of the instrument 9. The bimetallic spiral device 13 in addition to adjusting the temperature compensating resistance 12 is provided with a pointer 18 and scale 18' on which the existing ambient temperature is always indicated regardless of the position of switch 16.

It will be apparent that with switch 16 connecting the fixed resistance 15 in series with the thermocouple means at 1 and the instrument at 9, the instrument will have a deflection proportional to the difference in temperature at the dry and wet ends of the thermocouple unit, and that the lower scale 17 may be calibrated in degrees accordingly. If scale 17 is calibrated in degrees centigrade, scale 18' will also be calibrated in degrees centigrade, in which case the two readings may be referred to a centigrade psychrometric table to ascertain relative humidity. The last-mentioned method of using the apparatus to obtain relative humidity from temperature measurements and psychrometric tables can be used generally for all values of relative humidity, but it is much simpler to measure relative humidity directly by the use of the apparatus, and this is possible and practicable except for infrequent, unusual conditions. For the direct measurement of relative humidity, switch 16 is in the position shown connecting the temperature compensating variable resistance 12 in the measurement circuit.

Relative humidity is the ratio of the quantity of water vapor actually present in the atmosphere to the greatest amount possible (saturation) at the given temperature. To measure relative humidity directly with instrument 9, it is necessary to compensate the thermocouple output for variations in ambient temperature since the output of the thermocouple unit increases with rise in temperature in relation to relative humidity. Hence, the purpose of the temperature responsive variable resistance device comprising parts 12 and 13 is to insert resistance in the measurement circuit with rise in ambient temperature to the extent necessary to obtain a direct reading of relative humidity at instrument 9.

The increase in wet and dry bulb temperature difference with increase in ambient temperature is practically linear from 30 per cent to 100 per cent relative humidity and 32 degrees to 100 degrees F. In fact the error obtained by assuming that this relation is linear down to 20 per cent relative humidity is of the order of five per cent or less. It is therefore a relatively simple matter to compensate the output of the thermocouple means at 1 for ambient temperature variations over the ranges of ambient temperature and relative humidity most frequently encountered. Practical values of circuit resistances for the direct reading relative humidity apparatus are to use an instrument at 9 having 16.5 ohms, a resistance of 17.5 ohms for the three thermocouples at 1, and a variable resistance at 12 which varies from zero at 32 degrees F. (freezing point of water) to 65 ohms at 100 degrees F. For this combination the resistor 12 at 100 degrees F. constitutes over 65 percent of the circuit resistance and is to be varied at a uniform rate of slightly less than one ohm per degree. The bimetallic spiral 13 for moving a brush over the resistance 12 in accordance with these requirements may be made rugged and offers no difficulties.

For relative humidities below about 20 per cent at all ambient temperatures and for relative humidities below 70 per cent at ambient temperatures above about 100 degrees F., it is not represented that the direct reading arrangement will give accurate results and in such cases the switch 16 is moved to the lower contact to substitute the fixed resistance 15 for the variable resistance 12. The instrument 9 will now measure the difference between wet and dry junction temperatures, or "wet bulb depression" as it may be called. For this purpose a fixed resistance at 15 of 142 ohms is suitable. The instrument 9 is now read on the lower scale 17 which is calibrated in terms of wet bulb depression. Since the temperature compensator is also provided with a pointer 18 and scale 18' calibrated in ambient temperature, relative humidity may be obtained from the readings of instrument 9 lower scale and the thermometer scale 18' by reference to a psychrometric table. It will be apparent that the method of using the apparatus as last described may be employed for checking and calibrating the direct reading use of the apparatus and vice versa.

Since I have provided electrical means for providing a direct measurement of relative humidity, it now becomes practicable to provide for the automatic control of relative humidity and at 19 I have provided a metal vane on a rearward extension of the pointer of instrument 9, which may pass between the pair of coils 20 or 21 at selected adjustable values of relative humidity to initiate controls to decrease or increase the relative humidity. A control system employing such a metal vane moving between a pair of coils is described in United States Patent No. 2,589,991, March 18, 1952, assigned to the same assignee as the present invention.

In Fig. 2 I have represented another way of compensating for ambient temperature changes where the compensation is built into the measuring instrument corresponding to instrument 9 of Fig. 1 such that the compensator 12—13 of Fig. 1 is unnecessary. In Fig. 2 the poles of the permanent magnet are cut back, and pole pieces 22 and 23 made of a copper-nickel alloy, such as described in United States Patent No. 1,706,172, Kinnard, March 9, 1929, assigned to the same assignee as the present invention, are provided. The pole pieces have a negative temperature coefficient of permeability such that the field flux of the instrument decreases with a rise in temperature, thereby reducing the torque of the instrument for a given current with rise in temperature.

In Fig. 3 I provide a temperature variable resistance in shunt to the armature coil 11 of the instrument 9 consisting of a thermometer device 24 having a resistance wire 25 extending along its riser column. This resistance is connected through the mercury bulb across the lead from device 1 to instrument 9 such that as the ambient temperature rises, more of the current is shunted from the instrument, and its torque for a given output from device 1 is reduced. This takes the place of the compensator 12—13 of Fig. 1.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

Humidity-responsive apparatus for indicating relative humidity and temperature above about 20% relative humidity and at temperatures below about 100° F., and for indicating wet bulb depression and temperature at lower relative humidities and higher temperatures, comprising electrical thermocouple means having wet and dry junctions exposed to ambient temperatures, a current-responsive electrical instrument having an indicator cooperating with both a first scale graduated in terms of relative humidity units and a second scale graduated in terms of wet bulb depression units, said indicator and said scales being movable relative to one another responsive to currents flowing through said instrument, a temperature instrument having a bimetal movable responsive to ambient temperature, said temperature instrument having an indicator and a graduated temperature scale, said indicator and temperature scale of said temperature instrument being movable relative to one another by said bimetal, a variable resistance operated by said bimetal to provide increased and decreased resistance upon rise and fall of said ambient temperature, a fixed resistance of value greater than the maximum resistance of said variable resistance, means for selectively and independently coupling said variable resistance or said fixed resistance in a series circuit relationship with said thermocouple means and said current-responsive instrument, said variable resistance being proportioned and said first scale being graduated such that relative humidity is indicated by said first scale when said variable resistance is in said circuit relationship and the relative humidity indicated by said first scale in above about 20% at ambient temperatures below about 100° F. indicated by said temperature scale, and said fixed resistance being proportioned and said second scale graduated such that wet bulb depression is indicated by said second scale when said fixed resistance is in said circuit relationship.

References Cited in the file of this patent

UNITED STATES PATENTS

| | | |
|---|---|---|
| 856,944 | Cramer | June 11, 1907 |
| 1,098,472 | Bristol | June 2, 1914 |
| 2,109,222 | Ryder | Feb. 22, 1938 |
| 2,293,064 | Kahn | Aug. 18, 1942 |
| 2,548,550 | Minter | Apr. 10, 1951 |
| 2,603,972 | Kahn | July 22, 1952 |